United States Patent [19]

Marsh

[11] Patent Number: 5,144,522
[45] Date of Patent: Sep. 1, 1992

[54] CRITICALLY DAMPED CAPACITOR AND METHOD OF MAKING SAME

[75] Inventor: Richard N. Marsh, Cool, Calif.

[73] Assignee: Constant Velocity Transmission Lines, Inc., Auburn, Calif.

[21] Appl. No.: 689,168

[22] Filed: Apr. 22, 1991

[51] Int. Cl.$^5$ .......................... H01G 4/00; H01G 7/00
[52] U.S. Cl. ..................................... 361/306; 29/25.42
[58] Field of Search ............... 29/25.42; 361/301, 306, 361/308, 309, 310, 272, 275, 534

[56] References Cited

U.S. PATENT DOCUMENTS

| | | | |
|---|---|---|---|
| 1,324,792 | 12/1919 | Booth | 361/306 X |
| 2,636,920 | 4/1953 | Lockery et al. | 361/306 X |
| 3,236,936 | 2/1966 | Robinson | 361/306 X |
| 3,394,386 | 7/1968 | Weller et al. | 29/25.42 |

FOREIGN PATENT DOCUMENTS 881950  11/1961  United Kingdom ............... 29/25.42

*Primary Examiner*—Donald A. Griffin
*Attorney, Agent, or Firm*—Fliesler, Dubb, Meyer & Lovejoy

[57] ABSTRACT

A critically damped capacitor comprising a capacitance C having in series therewith a parasitic inductance $L_S$, a parasitic resistance $R_S$ and an additional resistance $R_A$ in series with the plates of the capacitor. The value of $R_A$ is chosen such that $$\frac{1}{2(R_S + R_A)C} = \frac{1}{LC}$$

The additional resistance $R_A$ in one embodiment is provided by a layer of conductive epoxy which is attached or added to one or both of the end plates of the capacitor. Electrical leads are coupled to the end plate having the epoxy by being embedded in the epoxy. If epoxy is not used on an end plate, the lead is coupled to the end plate in a conventional manner. In another embodiment the additional resistance $R_A$ is provided by a discrete resistor which is welded, soldered or otherwise attached to one or both of the end plates. If only one resistor is used, one lead of the capacitor is coupled to its end plate in a conventional manner and the second lead is coupled to the free end of the resistor. In one embodiment, the resistor is enclosed and the ends of the capacitor sealed by a non-electrically conductive epoxy. In another embodiment, the capacitor and resistor are enclosed within a container filled with non-conductive epoxy and the leads of the capacitor extend externally therefrom in a conventional manner so as to form an integrated capacitive element or device.

34 Claims, 3 Drawing Sheets

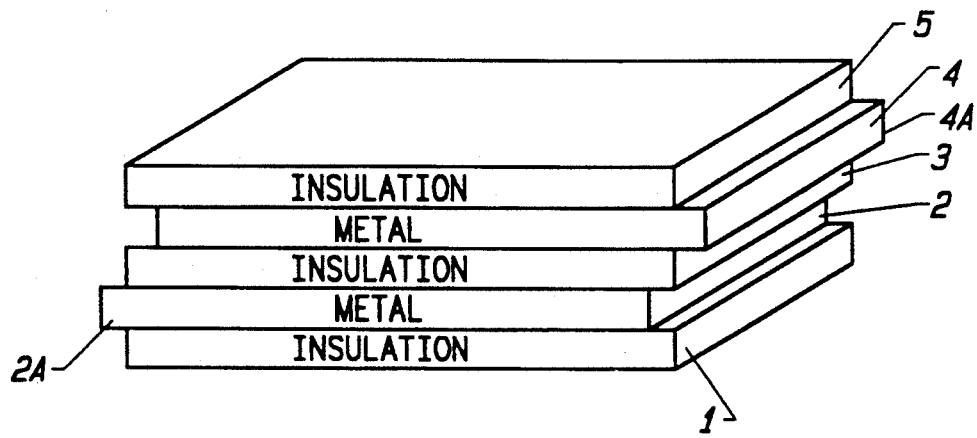
FIG. 1 *(PRIOR ART)*
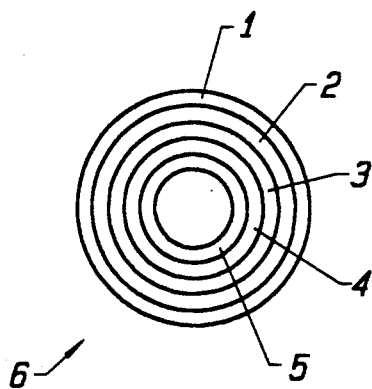
FIG. 2 *(PRIOR ART)*
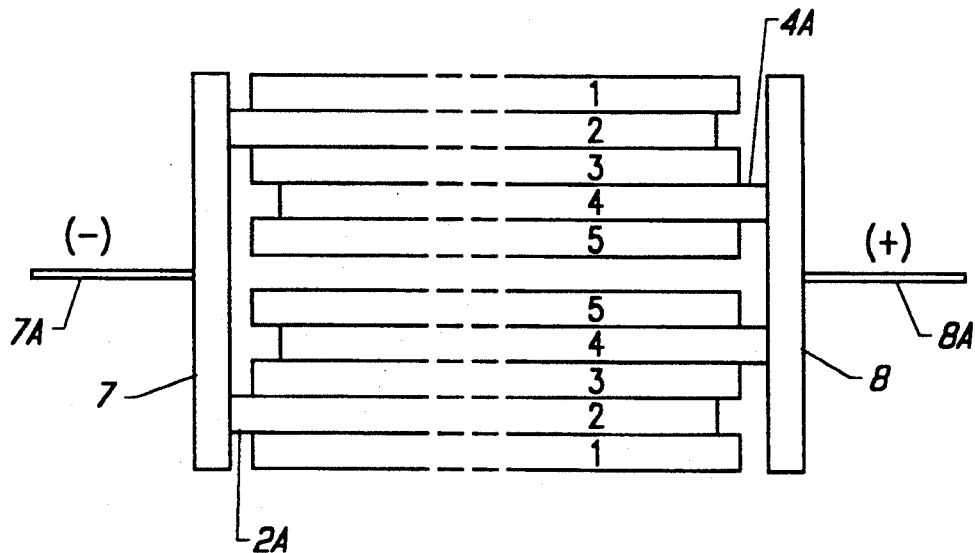
FIG. 3 *(PRIOR ART)*

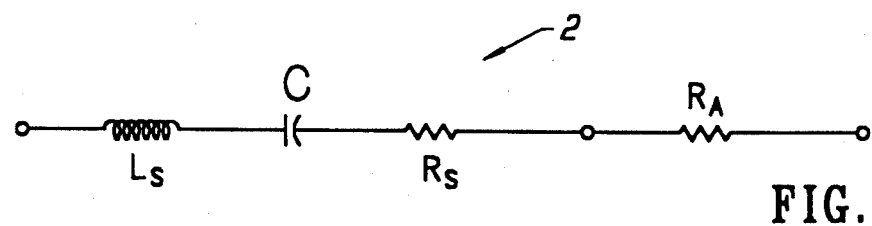
FIG. 8
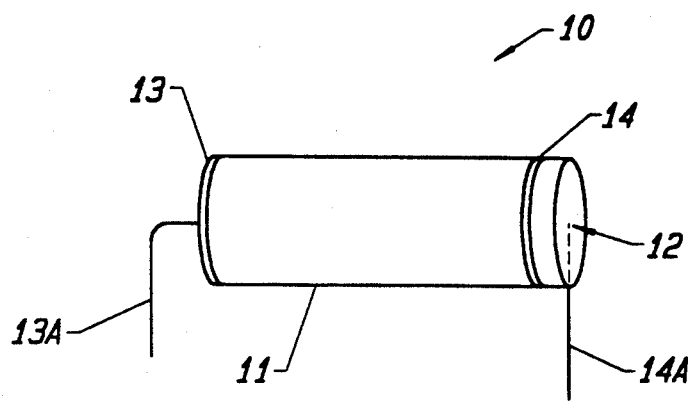
FIG. 9
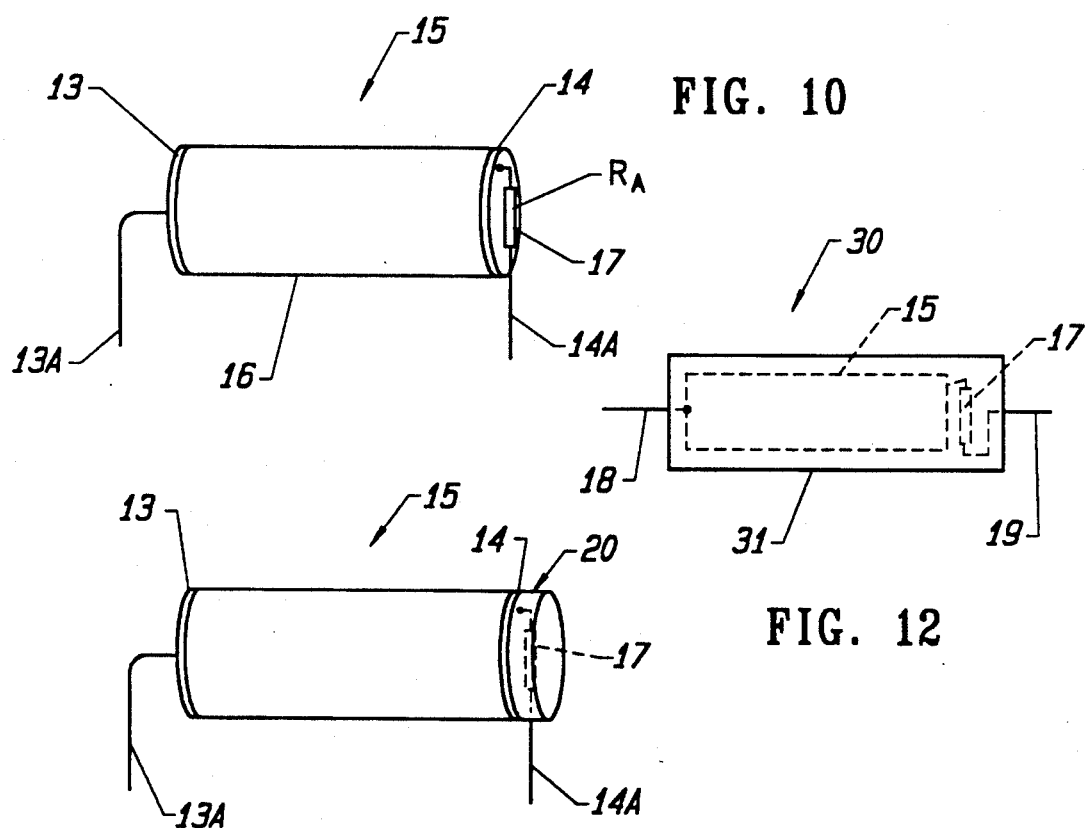
FIG. 10
FIG. 11
FIG. 12

CRITICALLY DAMPED CAPACITOR AND METHOD OF MAKING SAME

BACKGROUND OF THE INVENTION

1. Field of the Invention

The present invention relates to capacitors in general and in particular to an optimally or critically damped capacitor and a method of making the same.

2. Description of the Prior Art

All capacitors are composed of parasitic components such as resistance $R_S$ and inductance $L_S$ as shown in FIG. 4 herein. The value of $R_g$ and $L_s$ depends upon the materials and construction methods used to make the capacitor. The parasitic inductance $L_S$ and capacitance C of a typical capacitor will form a series resonant circuit at a particular frequency and if the values of $L_S$ and C are known, the resonant frequency can be calculated by the well known formula:

$$F = \frac{1}{2\pi \sqrt{L_S C}}$$

When an applied signal voltage or current has a frequency component at or very near the resonant frequency, the series resonance will be excited and a sustained oscillation will occur. How long the oscillation will persist depends upon how much dissipative resistance ($R_S$) is present. The presence of resistance, $R_S$, causes the oscillation voltage or current at resonance to decay towards zero. This is called a "damped" oscillation. For example, FIG. 5 herein shows a lightly damped or underdamped oscillation of a capacitor which has had its resonance excited. This oscillation is also called "ringing". Prolonged oscillation or ringing is very undesirable when it occurs in circuits that are required to have minimum waveform distortion. An underdamped capacitor or capacitive circuit condition exists when:

$$\frac{1}{2R_S C} < \frac{1}{LC}$$

In contrast to an underdamped condition, an overdamped capacitor or capacitive circuit exhibits a long generally non-periodic discharge time as shown in FIG. 6. The overdamped condition exists when:

$$\frac{1}{2R_S C} > \frac{1}{LC}$$

A capacitor or capacitive circuit is considered critically damped as shown in FIG. 7 when:

$$\frac{1}{2R_S C} = \frac{1}{LC}$$

While the electrical characteristics as shown in FIGS. 5-7 of underdamped, overdamped and critically damped capacitors and capacitive circuits are generally understood, critically damped capacitors, such as those made with low loss or high Q dielectrics such as plastic film, ceramic and mica, are generally not available as single integrated electrical components. Consequently, it has been necessary for a person desiring to make a critically damped capacitor or capacitive circuit to use a conventional low loss or high Q dielectric capacitor together with a proper amount of discrete series resistance; the amount of reqired resistance being determined usually by time consuming and costly trial and error.

SUMMARY OF THE INVENTION

In view of the foregoing, principal objects of the present invention are a critically damped capacitor and a method of making the same.

The underdamped condition as described above typically exists for all capacitors made with low loss or high Q dielectric materials such as plastic films, ceramic and mica because the series resistance $R_S$ of the capacitor is too small.

In accordance with the above objects, a capacitor which typially exhibits an underdamped condition such as one made with low loss or high Q dielectric materials, e.g. plastic films, ceramic and/or mica, is provided with a series resistance $R_A$ which is added in series to the relatively low parasitic resistance $R_S$ normally associated with such capacitors. The exact value of $R_A$ to be added depends on the magnitude of the existing $R_S$. The exact value will be unique to each capacitor.

In each embodiment of the present invention a material having a specific resistance $R_A$ such that:

$$\frac{1}{2(R_S + R_A)C} = \frac{1}{LC}$$

is applied or attached to one or both of the positive and negative end plates used for coupling the interior positive and negative capacitive plates of the capacitor to exterior circuit elements by means of capacitor leads extending from the end plates.

In a preferred embodiment of the present invention comprising a single integrated critically damped capacitive component, the material comprises a conductive epoxy for providing the resistance $R_A$ and at the same time sealing the ends of the plate(s). One end of either or both of the capacitor leads is embedded in the epoxy depending on whether or not the epoxy is used on both ends. If not, conventional lead attaching techniques are used on the non-epoxied end.

In another embodiment, a discrete resistor is welded or soldered to one of the end plates of the capacitor and then embedded in an epoxy or other electrically insulating material so as to form a single integrated critically damped capacitive component.

In still another embodiment, the single integrated critically damped capacitive component is formed by a conventional low loss or high Q dielectric capacitor in series with a resistor having a resistance $R_A$, which capacitor and resistor are then enclosed in a container filled with an electrically non-conductive epoxy or other suitably electrically insulating material.

BRIEF DESCRIPTION OF THE DRAWINGS

The above and other objects, features and advantages of the present invention will become apparent from the following detailed description of the accompanying drawings, in which:

FIG. 1 is a perspective view of sheets of electrically conductive and electrically non-conductive material used in fabricating a conventional capacitor;

FIG. 2 is an end view of a capacitor, omitting the end plates, which is made using the sheets of FIG. 1;

FIG. 3 is a cross-section of a capacitor showing end plates electrically attached to the electrically conductive sheets, i.e. internal plates, of the capacitor;

FIG. 8 is a schematic drawing of an equivalent circuit of a critically damped capacitor according to the present invention;

FIG. 9 is a side view of a preferred embodiment of a critically damped capacitor according to the present invention; and FIGS. 10-12 are side views of still other embodiments of the present invention.

DETAILED DESCRIPTION OF THE DRAWINGS

Figure 4:
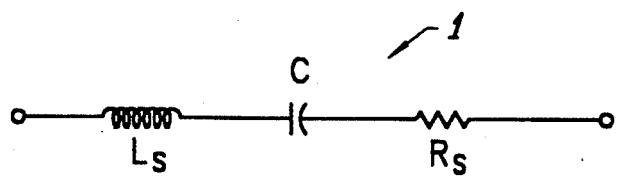
FIG. 4 is a schematic diagram of an equivalent circuit of a conventional capacitor.

Referring to FIGS. 1-3, a typical conventional cylindrically shaped capacitor is made from a plurality of sheets of electrically conductive and electrically non-conductive material. For example, on top of a first sheet of electrically non-conductive material 1 there is provided an electrically conductive sheet 2. The left end 2A of the sheet 2 is provided to extend a short distance beyond the end of the sheet 1. On top of the sheet 2 there is provided an electrically insulating sheet 3. On top of the sheet 3 there is provided an electrically conducting sheet 4. The right end 4A of the sheet 4 extends a short distance beyond the end of the sheet 3. On top of the sheet 4 there is provided an electrically non-conducting sheet 5. The sheets 1-5 are then folded or rolled to form a cylinder 6, one end of which is shown in FIG. 2. After the cylinder 6 is formed, end plates 7 and 8 are formed and electrically coupled or connected to the end 2A of the electrically conductive layer 2 and the end 4A of the electrically conductive layer 4, respectively, as shown in FIG. 3. Capacitor leads 7A and 8A are soldered or otherwise attached to the end plates 7 and 8, respectively, so as to provide a means for coupling the capacitor into an electrical circuit. While the capacitor of FIGS. 1-3 is described as comprising only two internal cylindrical plates 2 and 4, it is understood that a plurality of such plates could be formed using the same process by rolling the sheets 1-5 in an overlapping fashion a number of times and that positive and negative ones of such plates would be electrically attached to the end plates 7 and 8, respectively. The terms positive and negative are used only to represent the polarity of a conventional capacitor and to emphasize that the interior plate(s), e.g. plate(s) 2, electrically coupled to the end plate 7 are electrically insulated from the interior plate(s), e.g. plate(s) 4, electrically attached to the end plate 8.

There are several well known methods for forming and attaching end plates 7 and 8 to the internal plates 2 and 4. For example, one popular method is to spray molten aluminum metal at each end of the capacitor until enough aluminum has built up to cause a first short between the internal plates used for forming the positive plates and a second short between the internal plates used for forming the negative plates, respectively. A capacitor lead is then attached to each of the positive and negative end plates. Thereafter, epoxy is used to cover the end plates to prevent moisture entry and provide strength.

Referring to FIG. 4, there is shown an equivalent circuit of a conventional capacitor designated generally as 1 comprising a capacitance C having in series therewith a parasitic inductance $L_S$ and a parasitic resistance $R_S$. The value of $R_S$ and $L_S$ depends upon the materials and the construction methods used to make the capacitor. The $L_S$ and C will form a series resonance circuit at a particular frequency and if the values of $L_S$ and C are known, the resonant frequency can be calculated by the well known formula:

$$F = \frac{1}{2\pi \sqrt{L_S C}}$$

As described above, when an applied signal voltage or current has a frequency component at or very near the resonant frequency, the series resonance will be excited and a sustained oscillation will occur. How long the oscillation will persist depends upon how much dissipative resistance $R_S$ is present. The presence of resistance $R_S$ causes the oscillation voltage or current at resonance to decay towards zero. This is called a "damped" oscillation.

Figure 5:
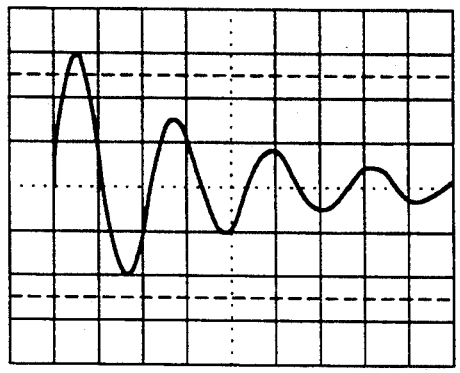
FIG. 5 is a diagram showing the electrical characteristics of an underdamped capacitor.

Referring to FIG. 5, there is shown an electrical characteristic of a lightly damped or underdamped oscillation of a capacitor which has its resonance excited. This oscillation is also called "ringing". Prolonged oscillation or ringing is very undesirable when it occurs in circuits that are required to have minimum waveform distortion. The underdamped condition occurs when:

$$\frac{1}{2R_S C} < \frac{1}{LC}$$

The electrical characteristic of an overdamped capacitor is shown in FIG. 3. The overdamped condition exists when:

$$\frac{1}{2R_S C} > \frac{1}{LC}$$

Figure 6:
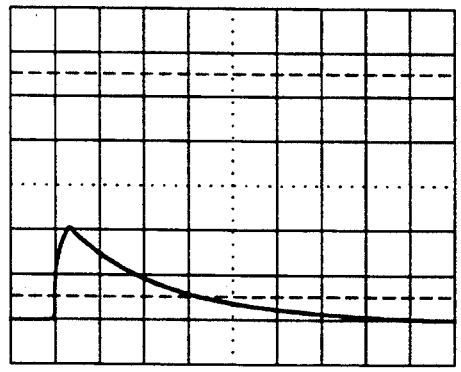
FIG. 6 is a drawing showing the electrical characteristics of an overdamped capacitor.

As can be seen from FIG. 6, an overdamped capacitor exhibits a prolonged discharge period.

Figure 7:
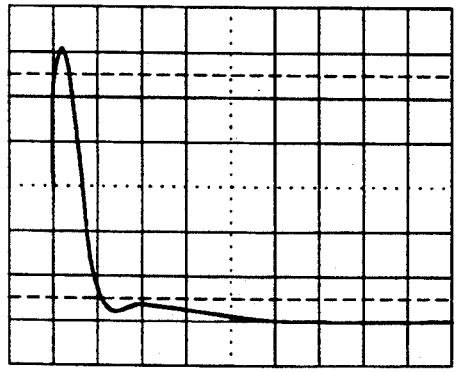
FIG. 7 is a drawing showing the electrical characteristics of a critically damped capacitor.

The electrical characteristic of a critically damped capacitor is shown in FIG. 7. This condition exists when:

$$\frac{1}{2R_S C} = \frac{1}{LC}$$

As shown in FIG. 7, a critically damped capacitor exhibits a sharp rise and decay time and a very low, almost negligible, oscillation on the trailing edge thereof.

Referring to FIG. 8, there is shown an equivalent circuit of a critically damped capacitor according to the present invention designated generally as 2 comprising a capacitance C and in series therewith a parasitic inductance $L_S$, a parasitic resistance $R_S$ and an additional resistance $R_A$ The circuit of FIG. 5 is an equivalent circuit of a critically damped capacitor according to the present invention when:

$$\frac{1}{2(R_S + R_A)C} = \frac{1}{\sqrt{LC}}$$

The exact value of $R_A$ to be added in series with $R_S$ to set the damping to an optimum or critical amount depends on the magnitude of the existing $R_S$. The exact value will be unique to each capacitor.

Referring to FIG. 9, there is provided in accordance with the present invention a critically damped capacitor designated generally as 10. The capacitor 10 comprises within a main body portion 11 a plurality of plate members providing a capacitance C, such as plate members 2 and 4 of FIGS. 1-3, a plurality of non-conductive low loss or high Q dielectric electrically insulating layers, such as layers 1, 3 and 5 of FIGS. 1-3 and a pair of end plates 13 and 14 which correspond to end plates 7 and 8 of FIG. 3. Capacitor 10 comprises a parasitic inductance $L_S$ and a parasitic resistance $R_S$ in series with the capacitance C. To provide the additional resistance $R_A$ in series with the parasitic resistance $R_S$ a layer 12 of resistive material having the necessary coefficient of resistance, such as conductive epoxy, is added to the exterior surface of the end plate 14. A pair of capacitor leads 13A and 14A corresponding to leads 7A and 8A of FIG. 3 are then attached to the capacitor 10. The lead 13A is coupled to end plate 13 in a conventional manner and the lead 14A is coupled to end plate 14 via the conductive epoxy 12 by being embedded in the epoxy 12. While the epoxy 12 is shown being used on only the exterior surface of the end plate 14, it is to be understood that epoxy 12 could also be used for providing the resistance $R_A$ by being placed on the interior as well as the exterior surfaces of either or both of the end plates 13, 14 and thus serve to both provide the necessary series resistance $R_A$ as well as seal the ends of the capacitor.

In another embodiment of the present invention, the conventional method of forming the end plates 13 and 14 by spraying the ends of the capacitor with molten aluminum or other material having a low resistivity as described above is modified. Instead of using aluminum or other material having a low resistivity, an alloy, e.g. nickel, or other material, e.g. carbon, having the necessary resistivity to provide $R_A$ is used. Moreover, the formation of the end plates may involve spraying each end of the capacitor with molten material or with a material suspended in a carrier which evaporates rapidly.

The formation of end plates 13 and 14 may also comprise these sequential steps. In the first step the end plates are formed using the conventional method of spraying the ends of the capacitor with molten aluminum. In the second step, the end plates thus formed are covered with a layer of resistive material. In the third step, the resistive material is covered with a metal, e.g. aluminum or copper, to which the leads are then easily attached as by soldering.

Referring to FIG. 10, there is provided in another embodiment of the present invention a capacitor designated generally as 15 having a main body 16 comprising a capacitor C, a parasitic inductance $L_S$ and a parasitic resistance $R_S$ in series therewith, including end plates 13 and 14 and capacitor leads 13A and 14A as described above with respect to capacitor 10. In accordance with the present invention, a discrete resistor 17 is welded, soldered or otherwise attached in any suitable manner to the end plate 14 so as to provide the series resistance $R_A$. One of the capacitor leads 13A is attached to the end plate 13 in a conventional manner. The second capacitor lead 14A is attached to the resistor 17 in any suitable manner or is formed with the resistor 17 during the fabrication of the resistor. It is to be understood that, in lieu of using a single resistor, appropriately sized resistors may be attached to both end plates if desired.

Referring to FIG. 11, after the resistor 17 is attached to the end plate 14 of the capacitor 15, it is encased in a layer of non-conductive epoxy 20 so as to form a single integrated critically damped capacitive component or device.

Referring to FIG. 12, in still another embodiment of the present invention, there is provided a single integrated critically damped capacitor component designated generally as 30. The capacitor 30 comprises the capacitor 15 of FIG. 10 with the resistor 17 attached thereto enclosed within a container or other enclosure 31. The enclosure 31 is filled with a non-conductive epoxy so as to protect and stabilize the resistor 17 and encase the plates of the capacitor 15. The lead 13A and the lead 14A attached to the resistor 17 are provided to extend out of the ends of the enclosure 31 in a conventional manner.

While preferred embodiments of the present invention are described above, it is contemplated that various modifications may be made thereto without departing from the spirit and scope of the present invention. Accordingly, it is intended that the embodiments described be considered only as illustrative of the present invention and that the scope thereof should not be limited thereto but be determined by reference to the claims hereinafter provided and their equivalents.

What is claimed is:

1. A critically damped capacitor comprising:
   means for providing a capacitance having first and second cylindrical, concentric electrically conductive plate members which are longitudinally displaced relative to each other such that one edge of each fo said first and said second plate members extends beyond an adjacent edge of the other of said plate members, said second plate member being electrically insulated from said first plate member and said capacitance providing means having a capacitance C, a parasitic inductance $L_S$ and a parasitic resistance $R_S$;
   means for providing an additional resistance $R_A$ in series with said parasitic resistance $R_S$ such that $$R_A = (\tfrac{1}{2} L_S) - R_S$$

and;
   first and second capacitor lead members coupled to said first and said second plate members, respectively, with said means for providing said additional resistance $R_A$ being coupled in series with at least one of said first and second capacitor lead members, said first and second capacitor lead members being provided for connecting said capacitor in an electrical circuit.

2. A critically damped capacitor according to claim 1 comprising means for providing a first end plate member on one end of said first plate member and means for providing a second end plate member on one end of said second plate member, each of said first and second end plate member providing means having an interior surface and an exterior surface, and whereins aid means for providing an additional resistance $R_A$ comprises an electrically resistive material having said resistance $R_A$ applied to at least one of said first and second end plate member providing means.

3. A critically damped capacitor according to claim 2 wherein said electrically resistive material having said resistance $R_A$ is applied to said interior surface of at least one of said first and second end plate member providing means.

4. A critically damped capacitor according to claim 3 wherein said electrically resistive material having said resistance $R_A$ comprises an electrically conductive epoxy.

5. A critically damped capacitor according to claim 2 wherein said electrically resistive material having said resistance $R_A$ is applied to said exterior surface of at least one of said first and second end plate member providing means.

6. A critically damped capacitor according to claim 5 wherein said electrically resistive material having said resistance $R_A$ comprises an electrically conductive epoxy.

7. A critically damped capacitor according to claim 1 comprising means for providing a first end plate member on one end of said first plate member and means for providing a second end plate member on one end of said second plate member, each of said first and second end plate member providing means having an interior surface and an exterior surface, and wherein said means for providing an additional resistance $R_A$ comprises a discrete resistor electrically connected to said exterior surface of at leastone of said first and second end plate member providing means.

8. A critically damped capacitor according to claim 7 comprising means for enclosing said discrete resist or on the exterior surface of the end plate member providing means to which it is attached so as to form an integrated capacitive device including said discrete resistor with said first and second capacitor lead members extending therefrom.

9. A critically damped capacitor according to claim 8 wherein said enclosing means comprises a non-electrically conductive material.

10. A critically damped capacitor according to claim 9 wherein said non-electrically conductive material comprises a non-electrically conductive epoxy.

11. A critically damped capacitor according to claim 8 wherein said enclosing means comprises a containing means for containing said integrated capacitive element including said discrete resistor and further comprising a non-electrically conductive material located in said containing means for surrounding said integrated capacitive element including said resistor with said first and second capacitor lead members extending therefrom.

12. A method of fabricating a critically damped capacitor comprising the steps of:
providing a capacitance C using at least first and second cylindrical, concentric electrically conductive plate members which are longitudinally displaced relative to each other such that one edge of each of said first and said second plate members extends beyond an adjacent edge of the other of said plate members, said second plate member being electrically insulated from said first plate member, the means providing said capacitance C, having a parasitic inductance $L_S$ and a parasitic resistance $R_S$;

providing an additional resistance $R_A$ in series with said parasitic resistance $R_S$ such that $R_A = (\frac{1}{2} L_S) - R_S$ and;

coupling a first and a second capacitor lead member to said first and said second plate members, respectively, with said additional resistance $R_A$ being coupled in series with at least one of said first and second capacitor lead members, said first and second capacitor lead members being provided for connecting said capacitor in an electrical circuit.

13. A method of fabricating a critically damped capacitor according to claim 12 comprising the steps of:
forming a first end plate member on one end of said first plate member and forming a second end plate member on one end of said second plate member, each of said first and second end plate members having an interior surface and an exterior surface, and wherein said step of providing an additional resistance $R_A$ comprises the step of applying an electrically resistive material having said resistance $R_A$ to at least one of said first and second end plate members.

14. A method of fabricating a critically damped capacitor according to claim 13 wherein said step of applying said electrically resistive material having said resistance $R_A$ comprises the step of applying said material to said interior surface of at least one of said first and second end plate members.

15. A method of fabricating a critically damped capacitor accordin claim 14 wherein said electrically resistive material having said resistance $R_A$ an electrically resistive epoxy.

16. A method of fabricating a critically damped capacitor according to claim 13 wherein said step of applying said electrically resistive material having said resistance $R_A$ comprises the step of applying said material to said exterior surface of at least one of said first and second end plate members.

17. A method of fabricating a critically damped capacitor according to claim 16 wherein said electrically resistive material having said resistance $R_A$ comprises an electrically conductive epoxy.

18. A method of fabricating a critically damped capacitor according to claim 12 comprising the steps of:
forming a first end plate member on one end of said first plate member and forming a second end plate member on one end of said second plate member, each of said first and second end plate members having an interior surface and an exterior surface, and wherein said step of providing an additional resistance $R_A$ comprises connecting a discrete resistor to said exterior surface of at least one of said first and second end plate members.

19. A method of fabricating a critically damped capacitor according to claim 18 comprising the step of:
enclosing said discrete resistor on the exterior surface of the end plate member to which it is attached so as to form an integrated capacitive device including said discrete resistor with said first and second capacitor lead members extending therefrom.

20. A method of fabricating a critically damped capacitor according to claim 19 wherein said step of enclosing comprises the step of enclosing said resistor in a non-electrically conductive material.

21. A method of fabricating a critically damped capacitor according to claim 20 wherein said non-electrically conductive material comprises a non-electrically conductive epoxy.

22. A method of fabricating a critically damped capacitor according to claim 19 wherein said step of enclosing comprises the step of:

providing containing means for containing said integrated capacitive element including said discrete resistor and further comprising the step of filling said containing means with a non-electrically conductive material for surrounding said integrated capacitive element including said resistor with said first and second capacitor lead members extending therefrom.

23. A critically damped capacitor comprising:

means for providing a capacitance having first and second cylindrical, concentric, electrically conductive plate members, said second plate member being electrically insulated from said first plate member and said capacitance providing means having a capacitance C, a parasitic inductance $L_S$ and a parasitic resistance $R_S$; and means for sealing said first and said second cylindrical plate members against moisture, said sealing means includign means for providing an additional resistance $R_A$ in series with said parasitic resistance $R_S$, the magnitude of said resistance $R_A$ being such that $$R_A = (\tfrac{1}{2} L_S) - R_S$$

and;

first and second capacitor lead members for connecting said capacitor in an electrical circuit.

24. A critically damped capacitor according to claim 23 comprising means for providing a first end plate member on one end of said first plate member and means for providing a second end plate member on one end of said second plate member, each of said first and second end plate member providing means having an interior surface and an exterior surface, and wherein said sealing means for providing an additional resistance $R_A$ comprises an electrically resistive material having said resistance $R_A$ applied to at least one of said first and second end plate member providing means.

25. A critically damped capacitor according to claim 24 wherein said electrically resistive material having said resistance $R_A$ is applied to said interior surface of at least one of said first and second end plate member providing means.

26. A critically damped capacitor according to claim 25 wherein said electrically resistive material having said resistance $R_A$ comprises an electrically resistive epoxy.

27. A critically damped capacitor according to claim 24 wherein said electrically resistive material having said resistance $R_A$ is applied to said exterior surface of at least oen of said first and second end plate member providing means.

28. A critically damped capacitor according to claim 27 wherein said electrically resistive material having said resistance $R_A$ comprises an electrically resistive epoxy.

29. A method of fabricating a critically damped capacitor comprising the steps of:

providing a capacitance C using first and second cylindrical, concentric, electrically conductive plate members with said second plate member being electrically insulated from said first plate member, the means for providing said capacitance C having a parasitic inductance $L_S$ and a parasitic resistance $R_S$; and sealing said first and said second cylindrical plate members against moisture with a material and in a manner providing an additional resistance $R_A$ in series with said parasitic resistance $R_S$, the magnitude of said resistance $R_A$ being such that $$R_A = (\tfrac{1}{2} L_S) - R_S$$

and;

providing first and second capacitor lead members for connecting said capacitor in an electrical circuit.

30. A method of fabricating a critically damped capacitor according to claim 29 comprising the steps of:

forming a first end plate member on one end of said first plate member and forming a second end plate member on one end of said second plate member, each of said first and second end plate members having an interior surface and an exsterior surface, and wherein said sealing step comprises the step of applying an electrically resistive material having said resistance $R_A$ to at least one of said first and second end plate members.

31. A method of fabricating a crictially damped capacitor according to claim 30 wherein said step of applying said electrically resistive material having said resistance $R_A$ comprises the step of applying said material to said interior surface of at least one of said first and second end plate members.

32. A method of fabricating a critically damped capacitor according to claim 31 wherein said electrically resistive material having said resistance $R_A$ comprises an electrically resistive epoxy.

33. A method of fabricating a crictially damped capacitor according to claim 30 wherein said step of applying said electrically resistive material having said resistance $R_A$ comprises the step of applying said material to said exterior surface of at least one of said first and second end plate members.

34. A method of fabricating a critically damped capacitor according to claim 33 wherien said electrically resistive material having said resistance $R_A$ comprises an electrically resistive epoxy.

* * * * *

UNITED STATES PATENT AND TRADEMARK OFFICE
CERTIFICATE OF CORRECTION

PATENT NO. : 5,144,522

DATED : September 1, 1992

INVENTOR(S) : RICHARD N. MARSH

It is certified that error appears in the above-identified patent and that said Letters Patent is hereby corrected as shown below:

Column 1, line 13, delete "$R_g$ and $L_s$" and substitute --$R_s$ and $L_s$--.
Column 7, line 21, before "epoxy" delete "conductive" and substitute --resistive--.
Column 8, line 33, delete "accordin" and insert --according to--.
Column 8, line 34, before "an" insert --comprises--.

Signed and Sealed this

Fourteenth Day of September, 1993

Attest:

BRUCE LEHMAN

*Attesting Officer*    Commissioner of Patents and Trademarks